(12) United States Patent
Lee (10) Patent No.: US 12,469,285 B2
(45) Date of Patent: Nov. 11, 2025

(54) INTELLIGENT SYSTEM AND METHOD FOR EVENT TRACKING

(71) Applicant: 5Gen Care Limited, Hong Kong (HK)

(72) Inventor: Wai Hung Lee, Hong Kong (HK)

(73) Assignee: 5GEN CARE LIMITED, Hong Kong (HK)

( * ) Notice: Subject to any disclaimer, the term of this patent is extended or adjusted under 35 U.S.C. 154(b) by 378 days.

(21) Appl. No.: 18/003,919

(22) PCT Filed: Jun. 30, 2021

(86) PCT No.: PCT/CN2021/103430
§ 371 (c)(1),
(2) Date: Dec. 30, 2022

(87) PCT Pub. No.: WO2022/002108
PCT Pub. Date: Jan. 6, 2022

(65) Prior Publication Data
US 2023/0334861 A1    Oct. 19, 2023

(30) Foreign Application Priority Data

Jun. 30, 2020   (HK) ............................ 32020010263.2

(51) Int. Cl.
*G06V 20/40* (2022.01)
*G06F 3/02* (2006.01)
*G06Q 10/087* (2023.01)

(52) U.S. Cl.
CPC ............ *G06V 20/44* (2022.01); *G06F 3/0202* (2013.01); *G06Q 10/087* (2013.01)

(58) Field of Classification Search
CPC ... G06V 20/44; G06F 3/0202; G06F 3/04886; G06F 3/0489; G06Q 10/087; G06N 3/044; G06N 3/045; G06N 3/08; G06N 3/084
See application file for complete search history.

(56) References Cited

U.S. PATENT DOCUMENTS

| | | | |
|---|---|---|---|
| 2007/0032733 A1* | 2/2007 | Burton ................. | A61B 5/7264 600/509 |
| 2009/0144214 A1* | 6/2009 | Desaraju ............... | G06F 11/008 706/46 |

(Continued)

FOREIGN PATENT DOCUMENTS

| | | |
|---|---|---|
| CN | 108733825 A | 11/2018 |
| CN | 109480868 A | 3/2019 |

(Continued)

OTHER PUBLICATIONS

International Search Report of corresponding PCT Patent Application No. PCT/CN2021/103430 mailed on Aug. 27, 2021.

(Continued)

*Primary Examiner* — Iriana Cruz
(74) *Attorney, Agent, or Firm* — Idea Intellectual Limited; Sam T. Yip (57) ABSTRACT

An intelligent system (100) and method (400) for event tracking which can assist a user to predict event types and occurrence times of upcoming events the user needs to handle. The intelligent event tracking system (100) comprises: a cloud server (110) and a tracking device (120). The cloud server (110) is configured for determining an event type and an occurrence time of a current event and predicting an event type and an occurrence time of a next event based on the determined event type and occurrence time of the current event as well as statistical data related to occurrence time and frequency associated with the determined event type and/or at least one related event type.

16 Claims, 3 Drawing Sheets

(56) References Cited

U.S. PATENT DOCUMENTS

| | | | |
|---|---|---|---|
| 2013/0030875 A1* | 1/2013 | Lee | G06Q 30/0601 |
| | | | 705/14.58 |
| 2017/0278053 A1 | 9/2017 | High et al. | |
| 2019/0340567 A1* | 11/2019 | Long | G06F 1/1686 |
| 2021/0056536 A1* | 2/2021 | Carter | G06Q 20/065 |
| 2021/0241912 A1* | 8/2021 | Chazin | G08B 21/0446 |
| 2021/0295189 A1* | 9/2021 | Singh | G06N 20/10 |
| 2022/0028248 A1* | 1/2022 | Kruse | G08B 21/04 |

FOREIGN PATENT DOCUMENTS

| | | |
|---|---|---|
| CN | 109948851 A | 6/2019 |
| CN | 110245237 A | 9/2019 |
| CN | 110458355 A | 11/2019 |
| CN | 111160005 A | 5/2020 |
| KR | 102065780 B1 | 1/2020 |

OTHER PUBLICATIONS

European Search Report of corresponding European Patent Application No. 21834459.6 mailed on Jun. 12, 2024.

\* cited by examiner

INTELLIGENT SYSTEM AND METHOD FOR EVENT TRACKING

FIELD OF THE INVENTION

The present invention generally relates to an intelligent event tracking system and method, and particularly relates to an event tracking system and method capable to predict event type and occurrence time of a future event.

BACKGROUND OF THE INVENTION

Taking care of babies, elderlies or chronic patients can be demanding and exhausting. For example, unexperienced parents may face lots of challenges in handling a myriad of baby caring events such as milk feeding, sleeping, urination and defecation. Normally babies cry when they feel hungry, tired or uncomfortable due to urination & defecation and may have different crying patterns for different needs. It takes time for new parents to be familiar with the crying patterns of their baby and build up the capability to identify the needs of their baby immediately from the baby's crying patterns. When the baby is crying, the parents are anxious to look up its needs one by one. The more time the parents spend to figure out the exact need of the baby, the more severe baby's crying is, which further increase anxiety of the parents. If the parents can have reminder of the type and occurrence time of upcoming baby caring event, they could address the needs of their baby in time so that the baby crying can be reduced or even avoided. Then the anxiety of the parents can be reduced.

For elderlies, their capability of short-term memory is degraded. Daily routes may be challenging to them. They know their needs but it is easy for them to forget what to do in a schedule especially medical tasks which are important to their health. If elderlies have reminder of the type and occurrence time of upcoming events they need to care, it will reduce the corresponding risk due to missing the events in the schedule.

SUMMARY OF THE INVENTION

It is one objective of the present invention to provide an intelligent event tracking system and method for assisting a user to predict event types and occurrence times of upcoming events the user needs to handle.

According to one aspect of the present invention, the intelligent event tracking system comprises: a cloud server comprising an event data-base; a tracking device comprising: at least one receiving unit for receiving event data; at least one presenting unit for presenting event data; and a communication module connected with the receiving unit and the presenting unit and configured for receiving data from and transmitting event data to the cloud server.

The cloud server is configured for acquiring event data from the receiving unit via the communication module; determining an event type and an occurrence time of a current event from the received event data; retrieving statistical data related to occurrence time, frequency and distribution of event attributes associated with the determined event type and/or at least one related event type from the event data-base; predicting an event type and an occurrence time of a next event based on the determined event type and occurrence time of the current event as well as the retrieved statistical data related to occurrence time and frequency associated with the determined event type and/or at least one related event type; updating the event data-base with the predicted event type and occurrence time of the next event as well as the event data acquired from the receiving unit; and transmitting the predicted event type and occurrence time of the next event to the presenting unit via communication module; and the presenting unit is configured for presenting the predicted event type at the predicted occurrence time of the next event.

According to another aspect of the present invention, the intelligent event tracking method comprises: receiving event data with a receiving unit; transmitting event data from the receiving unit via a communication module to a cloud server; determining, with the cloud server, an event type and an occurrence time of a current event from the acquired event data; retrieving, with the cloud server, statistical data related to occurrence time and frequency associated with the determined event type and/or at least one related event type from the event data-base; predicting, with the cloud server, an event type and an occurrence time of a next event based on the determined event type and occurrence time of the current event as well as the retrieved statistical data related to occurrence time and frequency associated with the determined event type and/or at least one related event type; updating, with the cloud server, the event data-base with the predicted event type and occurrence time of the next event as well as the event data acquired from the receiving unit; and transmitting the predicted event type and occurrence time of the next event to the presenting unit via communication module; and presenting the predicted event type at the predicted occurrence time of the next event to the user by the presenting unit.

BRIEF DESCRIPTION OF THE DRAWINGS

Embodiments of the invention are described in more detail hereinafter with reference to the drawings.

DETAILED DESCRIPTION

In the following description, for purposes of explanation, specific details are set forth in order to provide a thorough understanding of the embodiment of the disclosure. However, it will be apparent to practitioner skilled in the art that the present disclosure may be practiced without these specific details or with an equivalent arrangement.

Figure 1:
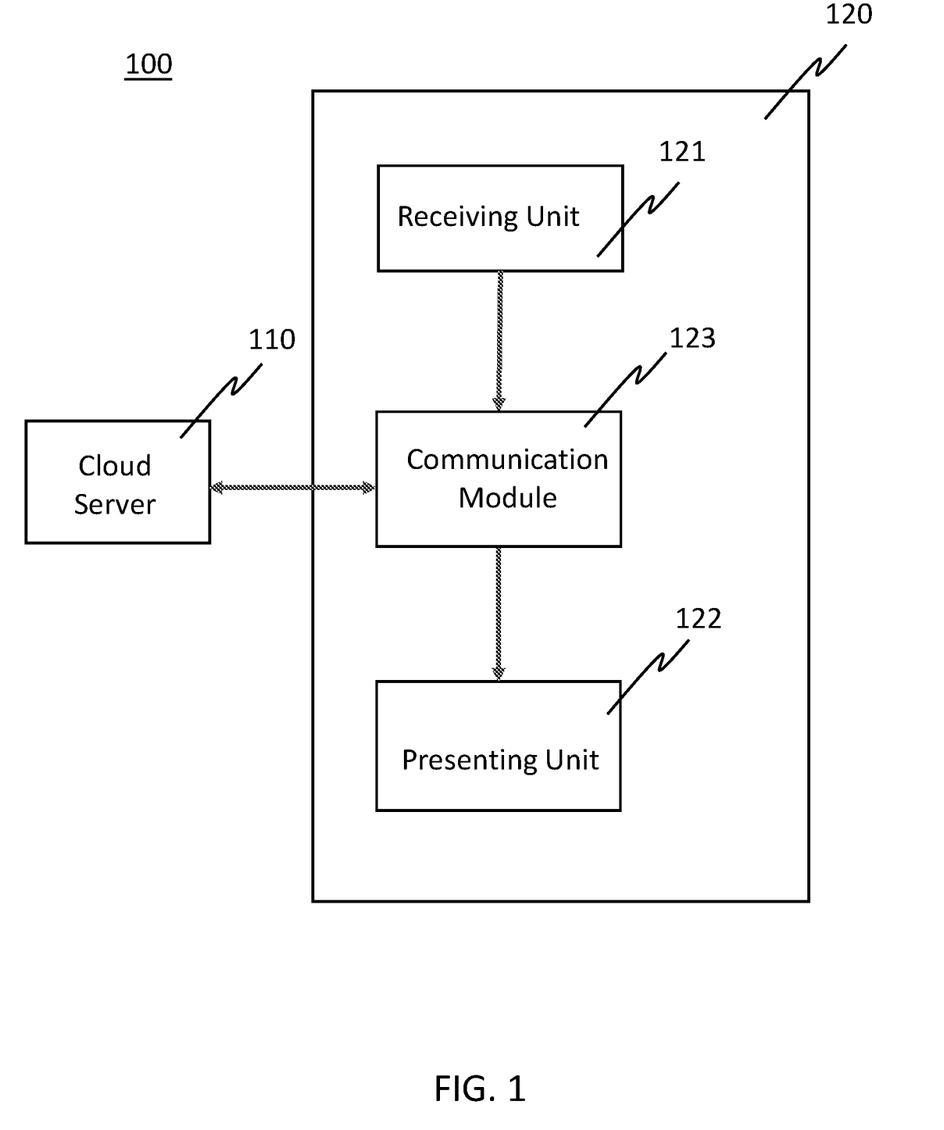
FIG. 1 depicts a block diagram of an intelligent event tracking system in accordance with an exemplary embodiment of the present invention.

Referring to FIG. 1. According to the present invention, an intelligent event tracking system 100 is provided. The intelligent event tracking system 100 may comprise: a cloud server 110 comprising an event data-base; at least one tracking device 120 comprising: at least one receiving unit 121 for receiving event data; at least one presenting unit 122 for presenting event data; and a communication module 123 connected with the receiving unit 121 and the presenting unit 122 and configured for receiving event data from and transmitting event data to the cloud server 110.

The cloud server 110 may be configured for acquiring event data from the receiving unit 121 via the communication module 123; determining an event type and an occurrence time of a current event from the received event data;

retrieving statistical data related to occurrence time, frequency and distribution of event attributes associated with the determined event type and/or at least one related event type from the event data-base; predicting an event type and an occurrence time of a next event based on the determined event type and occurrence time of the current event as well as the retrieved statistical data related to occurrence time and frequency associated with the determined event type and/or at least one related event type; updating the event data-base with the predicted event type and occurrence time of the next event as well as the event data acquired from the receiving unit 121; and transmitting the predicted event type and occurrence time of the next event to the presenting unit 122 via communication module 123. The presenting unit 122 is configured for presenting the predicted event type at the predicted occurrence time of the next event.

For example, for baby-caring, diaper changing event is a regular event happening in daytime. The frequency and amount of urination and defecation is highly correlated to the volume of milk consumed by the baby. Depending on the digestive system of baby, the time lag of diaper changing after milk feeding has somehow a normal distribution. This distribution can be extracted from the event history of diaper changing and other related events. For example, the prediction of diaper changing is related to the occurrence time, frequency and milk volume consumed of feeding. Here, the milk volume is the event attribute of feeding. Therefore, the more event types and their related attributes are recorded by using the tracking device, the more statistical event data are accumulated and the more accurate the event prediction can be achieved.

Also, the prediction of upcoming event in cloud server 110 may take consideration of the long-term trend and short-term variation of event data. For example, a baby's behavior may change from time to time. Therefore, the prediction should adapt to the baby's behavior as much as possible. Thus, statistical event data for a baby shall reflect both long term and short-term event trend. In contrast, for certain event type such as medical in-take, the occurrence time of upcoming event is fixed based on the doctor prescription.

The presenting unit 122 can be a mobile device of a user. The prediction of upcoming event will be presented to the user by push notification at the occurrence time of predicted event. The user is able to open the mobile app and view the predicted event, historical trend of the predicted event type or other related event type. Then, the user can decide how to react to the prediction. Normally, the user may follow the reminder of predicted event and take the corresponding actions.

Optionally, the cloud server 110 may be further configured for training a deep learning model with the event data-base and using the trained deep learning model to predict the event type and occurrence time of the next event.

Optionally, the cloud server 110 may be further configured for determining a duration of the current event from the received event data; updating the event data-base with the determined duration of the current event; and adjusting the predicted occurrence time and predicted event type of the next event based on the determined duration of the current event.

In one embodiment, the cloud server 110 may be further configured for converting the predicted event type and occurrence time of the next event into audio signals. The presenting unit 122 may comprise a speaker configured for receiving the audio signals from the cloud server 110 from the communication module 123 and converting the received audio signals to sounds.

In another embodiment, the cloud server 110 may be further configured for converting the predicted event type and occurrence time of the next event into display signals; and the presenting unit 122 may comprise a display configured for receiving the display signals from the cloud server 110 via the communication module 123 and converting the received display signals to images or videos.

Preferably, the cloud server 110 may be further configured for converting the historical and statistical event data into display signals; and the display may be configured for receiving the display signals from the cloud server 110 via the communication module 123 and converting the received display signals to graphs or motion images.

Figure 2:
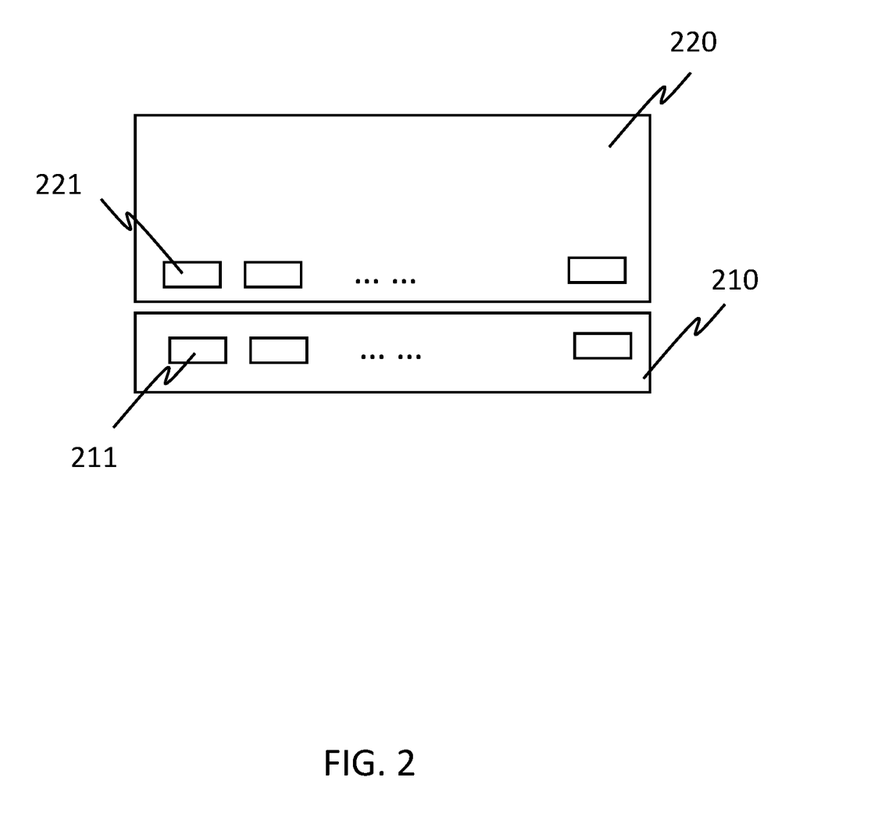
FIG. 2 depicts a capacitance touch slider and a display panel in accordance with an exemplary embodiment of the present invention.

In one embodiment as shown in FIG. 2, the receiving unit 121 may comprise a capacitance touch slider 210 comprising one or more touching regions 211. The tracking device 120 may further comprise a display panel 220. The capacitance touch slider is positioned in proximity to the display panel 220; and the display panel 220 is configured to display one or more reconfigurable informative labels 221 corresponding to the one or more touching regions 211 of the capacitance touch slider at locations adjacent to the touch regions of slider respectively.

The cloud server 110 may be further configured for determining the event type and the occurrence time of the current event when one of the touching regions 211 is triggered.

The duration of the current event may be a time difference between an event-start time when one of the touching regions 211 is triggered for inputting the event type and an event-end time when the touching region triggered at the event-start time is triggered again.

Preferably, the display panel 220 may be further configured to display a user-interface for reconfiguring triggering modes of the one or more touching regions. Each of the touch regions 211 is divided into one or more sub-regions to facilitate a user to input one or more event attributes of the current event.

Figure 3:
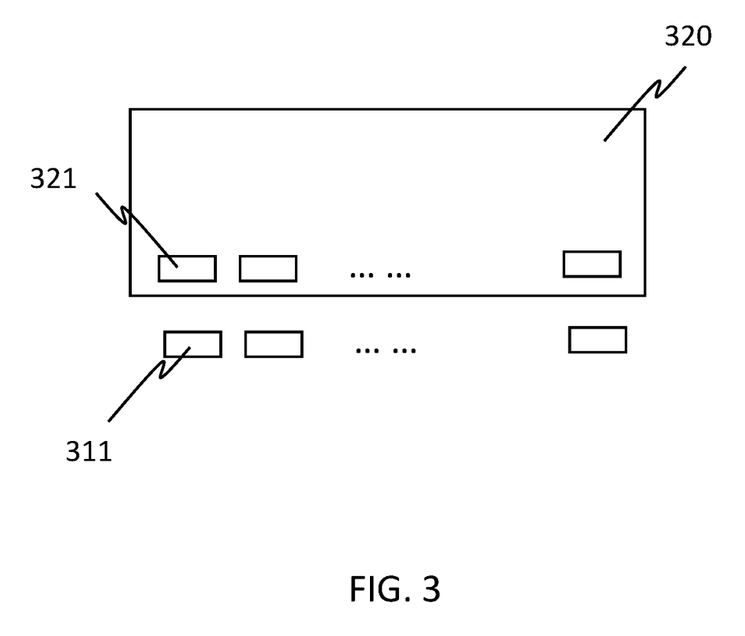
FIG. 3 depicts one or more physical buttons and a display panel in accordance with an exemplary embodiment of the present invention.

In one embodiment as shown in FIG. 3, the receiving unit 121 may comprise one or more physical buttons 311. The tracking device 120 may further comprise a display panel 320. The one or more physical buttons 311 are positioned in proximity to the display panel 320; and the display panel 320 is configured to display one or more reconfigurable informative labels 321 corresponding to the one or more physical buttons 311 at locations adjacent to the one or more physical buttons respectively.

The cloud server 110 may be further configured for determining the event type and the occurrence time of the current event when one of the physical buttons 311 is triggered.

The duration of the current event may be a time difference between an event-start time when one of the physical buttons 311 is triggered for inputting the event type and an event-end time when the physical button triggered at the event-start time is triggered again.

Optionally, each of the physical buttons 311 may comprise a sensor configured to sense one or more directions of a force applied thereon to facilitate a user to input one or more event attributes of the current event.

The one or more physical buttons 311 may be configured to have more button triggering modes for entering more information regarding event attributes. The display panel 320 may be further configured to display a user-interface for defining an event template corresponding to each of the triggering modes of the one or more physical buttons 311. The event template may include a set of event attributes for a particular event type. The basic triggering mode may simply be a single-clicking wherein the button is pressed for a short period and released. If user wants to store an event with more information, more triggering modes, such as double-clicking, long pressing, very long pressing, triple-clicking, clicking followed by long pressing can be used. Once a triggering mode is performed, its defined corresponding event template will be used as event data for event prediction.

The one or more physical buttons 311 may be designed with recognizable features, including but not limited to, special pattern, touchable dots or special shape to facilitate touch sensing or visual sensing. The pattern or shape should be chosen to be easily recognized. When physical buttons 311 are configurable through user interface of tracking device or mobile app, the buttons with recognizable features will be helpful to select the correct button for inputting the event type or event attributes without using the sense of sight to find the buttons. Even there is a label in the display panel to indicate the event type of each of physical buttons 311, the button design with recognizable features are easy to remember than the label.

In one embodiment, the receiving unit 121 may comprise a touch display comprising one or more touch screen buttons. The cloud server 110 may be further configured for determining the event type and the occurrence time of the current event when one of the touch screen buttons is triggered.

The duration of the current event may be a time difference between an event-start time when one of the touch screen buttons is triggered for inputting the event type and an event-end time when the touch screen button triggered at the event-start time is triggered again. Optionally, the touch screen buttons are categorized and organized in a single-level menu or multi-level menu.

In one embodiment, the receiving unit 121 may comprise a microphone for receiving one or more sound recordings. The cloud server 110 may be further configured for determining the event type and the occurrence time of the current event from the one or more received sound recordings. Preferably, the cloud server 110 may be further configured for determining one or more event attributes of the current event from the received sound recordings.

In one embodiment, the receiving unit 121 may comprise a camera for capturing one or more videos. The cloud server 110 may be further configured for determining the event type and the occurrence time of the current event from the one or more captured videos. Preferably, the cloud server 110 may be further configured for determining one or more event attributes of the current event from the captured videos.

In case of that automatic recognition of the received sound recordings and captured videos are not effective or accurate, the microphone and display may be configured to allow the user listen the recorded audio or view the captured videos to recall the memory about the event attributes and edit the event records. Furthermore, the user interface of tracking device or mobile app may be configured to facilitate the user to change the event attributes no matter there is an event related media in record or not. In case that the user misses some event details or even the whole event record when the event happens, the user interface of tracking device or mobile app may facilitate the user to fill in the missing part.

In one embodiment, the communication module 123 may be further configured for detecting a relative signal strength indicator (RSSI) signal pattern of the current event. The cloud server 110 may be further configured for determining the event type and the occurrence time of the current event from the detected RSSI signal pattern by matching the detected RSSI signal pattern with historical RSSI signal patterns.

The receiving unit 121 may further comprise a motion sensor for sensing a motion pattern of the current event. The cloud server 110 may be further configured for determining the event type and the occurrence time of the current event from the sensed motion pattern by matching the sensed motion pattern with historical motion patterns.

The cloud server 110 may be further configured to identify a personal whom the current event is belong to by matching the detected current motion pattern and RSSI signal pattern against historical motion patterns and RSSI signal patterns.

In one embodiment, the tracking device 120 may comprise a display panel configured to display a user-interface to facilitate a user to input physical attributes of a person who the user needs to take care of, such as a baby, elderly or patient. The cloud server 110 is configured to construct a personal profile including the inputted physical attributes or general data collected from a social media platform.

In another embodiment, the tracking device 120 may comprise a display panel configured to display a user-interface to facilitate a user to input inventory quantities of one or more consumables related to an event type. The cloud server 110 may be further configured to calculate inventory quantities of the one or more consumables based on an occurrence frequency associated with the event type stored in the cloud server 110, and the inputted quantities of inventory. Preferably, the user-interface may be further configured to facilitate the user to input brand names, models and other shopping information of the one or more consumables related to the event type, and a threshold inventory quantity. The cloud server 110 may be further configured to automatically place on-line order for the one or more consumables related to the event type if the recorded inventory quantities of consumables related to the event type is below the inputted threshold inventory quantity.

In one embodiment, the cloud server 110 may be further configured to compare the statistical event data for an individual person with the global statistical event data; and send comparison results and corresponding advices to a mobile device of the user, mobile devices of other users who are granted with permission, or a tracking device 120 with display panel for reviewing and taking preauction actions when the statistical event data of individual person deviate significantly from the norm of the global statistical event data.

The global statistical event data can be coming from other event tracking systems being used by other users and connected to the cloud server. When personal event data is sent to the cloud server 110 through the communication modules 123, the cloud server 110 may collect all these event data from different users and prepare an anonymous statistical event data for individual comparison. The global statistical event data can be classified according to physical attributes of personal profiles provided by different users. The individual comparison may focus on the special behavior or characteristics of individuals in a particular classification of interest when comparing individual event data to the statistical event data in the classification rather than the overall statistics. Finally, the global statistical event data can be considered in the prediction of upcoming event for an individual. This is particular useful when the user is just started to use the event tracking system and generate just a few event data to create reasonable statistical event data for prediction. The cloud server 110 may be further configured to use the global statistical event data as a vital data source for training the deep learning model and using the trained deep learning model to predict the event type and occurrence time of the next event In one embodiment, the tracking device 120 may be a monitor unit of a baby monitor, wherein the communication module 123 is a Wi-Fi module connecting to a router; the receiving unit 121 is a capacitance touch slider on the monitor unit; the presenting unit 122 is a display panel of the tracking device 120; and the event type is a baby-caring event.

In one embodiment, the tracking device 120 may be a phone casing of a mobile device of user, wherein the communication module 123 is a Bluetooth Low Energy (BLE) module connecting to a mobile device of user; the receiving unit 121 is physical buttons on the phone casing; and the event type is a medical event.

In one embodiment, the tracking device 120 may be a desk clock, wherein the communication module 123 is a GSM module connecting to a cellular network; the receiving unit 121 is physical buttons on the desk clock; the presenting unit 122 is a mobile app running on mobile device of family member of elderly; and the event type is an elderly-caring event.

According to the present invention, an intelligent event tracking method 400 is provided. The intelligent event tracking method may comprise: receiving event data with a receiving unit; transmitting event data from the receiving unit via a communication module to a cloud server; determining, with the cloud server, an event type and an occurrence time of a current event from the acquired event data; retrieving, with the cloud server, statistical data related to occurrence time and frequency associated with the determined event type and/or at least one related event type from the event data-base; predicting, with the cloud server, an event type and an occurrence time of a next event based on the determined event type and occurrence time of the current event as well as the retrieved statistical data related to occurrence time and frequency associated with the determined event type and/or at least one related event type; updating, with the cloud server, the event data-base with the predicted event type and occurrence time of the next event as well as the event data acquired from the receiving unit; and transmitting the predicted event type and occurrence time of the next event to the presenting unit via communication module; and presenting the predicted event type at the predicted occurrence time of the next event to the user by the presenting unit.

Optionally, the intelligent event tracking method may further comprise training a deep learning model with the event data-base; and using the trained deep learning model to predict the event type and occurrence time of the next event.

Preferably, the intelligent event tracking method may further comprise converting the predicted event type and occurrence time of the next event into audio signals; and converting the received audio signals to sounds.

Preferably, the intelligent event tracking method may further comprise converting the predicted event type and occurrence time of the next event into display signals; and converting the received display signals to images or videos.

Optionally, the intelligent event tracking method may further comprise determining a duration of the current event from the received event data; updating the event data-base with the determined duration of the current event; and adjusting the predicted occurrence time and predicted event type of the next event based on the determined duration of the current event.

Optionally, the intelligent event tracking method may further comprise receiving one or more sound recordings; determining the event type and the occurrence time of the current event from the one or more received sound recordings; and determining one or more event attributes of the current event from the one or more received sound recordings.

Optionally, the intelligent event tracking method may further comprise capturing one or more videos; determining the event type and the occurrence time of the current event from the one or more captured videos; and determining one or more event attributes of the current event from the one or more captured videos.

Optionally, the intelligent event tracking method may further comprise detecting a relative signal strength indicator (RSSI) signal pattern of the current event; and determining the event type and the occurrence time of the current event from the detected RSSI signal pattern by matching the detected RSSI signal pattern with historical RSSI signal patterns.

Optionally, the intelligent event tracking method may further comprise sensing a motion pattern of the current event; and determining the event type and the occurrence time of the current event from the sensed motion pattern by matching the sensed motion pattern with historical motion patterns.

Optionally, the intelligent event tracking method may further comprise detecting a relative signal strength indicator (RSSI) signal pattern of the current event; sensing a motion pattern of the current event, and identifying a personal whom the current event is belong to by matching the detected current motion pattern and RSSI signal pattern against historical personal-motion patterns and RSSI signal patterns.

Optionally, the intelligent event tracking method may further comprise constructing a personal profile including physical attributes of a person inputted by a user or general data collected from a social media platform.

Optionally, the intelligent event tracking method may further comprise calculating inventory quantities of the one or more consumables based on an occurrence frequency associated with the event type stored in the cloud server, and the inputted quantities of inventory of one or more consumables related to an event type inputted by a user.

Optionally, the intelligent event tracking method may further comprise placing on-line order for the one or more consumables related to the event type if recorded inventory quantities of consumables related to the event type is below a threshold inventory quantity inputted by a user.

Optionally, the intelligent event tracking method may further comprise comparing the statistical event data for an individual person with global statistical event data; and sending comparison results and corresponding advices to a mobile device of the user, mobile devices of other users who are granted with permission, or a tracking device with display panel for reviewing and taking preauction actions when the statistical event data of individual person deviate significantly from the norm of the global statistical event data.

The embodiments disclosed herein may be implemented using computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

The embodiments include computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

What is claimed is:

1. A system for autonomously tracking events related to caring vulnerable persons, comprising:
   a cloud server comprising an event data-base;
   a tracking device comprising:
      at least one receiving unit for receiving event data;
      at least one presenting unit for presenting event data; and
      a communication module connected with the receiving unit and the presenting unit and configured for receiving event data from and transmitting event data to the cloud server;
   wherein the cloud server is configured for
      acquiring event data from the receiving unit via the communication module;
      determining an event type and an occurrence time of a current event from the acquired event data;
      retrieving statistical event data related to occurrence time, frequency and distribution of event attributes associated with the determined event type and/or at least one related event type from the event data-base;
      predicting an event type and an occurrence time of a next event based on the determined event type and occurrence time of the current event as well as the retrieved statistical event data related to occurrence time, frequency and distribution of event attributes associated with the determined event type and/or at least one related event type;
      updating the event data-base with the predicted event type and occurrence time of the next event as well as the event data acquired from the receiving unit; and
      transmitting the predicted event type and occurrence time of the next event to the presenting unit via communication module; and
   wherein the presenting unit is configured for presenting the predicted event type at the predicted occurrence time of the next event; and
   wherein the at least one receiving unit comprises one or more buttons;
   wherein the cloud server is further configured for:
      determining a duration of the current event from the acquired event data;
      adjusting the predicted occurrence time and predicted event type of the next event based on the determined duration of the current event; and
   wherein the duration of the current event is a time difference between an event-start time when one of the buttons is triggered for inputting the event type and an event-end time when the button triggered at the event-start time is triggered again.

2. The system of claim 1, wherein the cloud server is further configured for:
   training a deep learning model with the event data-base; and
   using the trained deep learning model to predict the event type and occurrence time of the next event.

3. The system of claim 1, wherein the tracking device further comprises a display panel; and wherein
   the one or more buttons are physical buttons positioned in proximity to the display panel; and
   the display panel is configured to display one or more reconfigurable informative labels corresponding to the one or more physical buttons at locations adjacent to the one or more physical buttons respectively.

4. The system of claim 3, the display panel is further configured to display a user-interface for reconfiguring triggering modes of the one or more physical buttons.

5. The system of claim 1, wherein the receiving unit comprises a microphone for receiving one or more sound recordings; and
   the cloud server is further configured for determining the event type and the occurrence time of the current event from the one or more received sound recordings.

6. The system of claim 5, wherein the cloud server is further configured for
   determining one or more event attributes of the current event from the one or more received sound recordings; and
   adjusting the predicted occurrence time and predicted event type of the next event based on the determined event attributes of the current event.

7. The system of claim 1, wherein the receiving unit comprises a camera for capturing one or more videos; and
   the cloud server is further configured for determining the event type and the occurrence time of the current event from the one or more captured videos.

8. The system of claim 7, wherein the cloud server is further configured for
   determining one or more event attributes of the current event from the one or more captured videos; and
   adjusting the predicted occurrence time and predicted event type of the next event based on the determined event attributes of the current event.

9. The system of claim 1, further comprising a display panel for displaying a user-interface; and wherein:
   the user-interface is further configured to facilitate the user to input inventory quantities of one or more consumables related to an event type, brand names, models and other shopping information of the one or more consumables related to the event type, and a threshold inventory quantity; and
   the cloud server is further configured to: calculate inventory quantities of the one or more consumables based on an occurrence frequency associated with the event type stored in the cloud server, and the inputted quantities of inventory; and automatically place on-line orders for the one or more consumables related to the event type if the recorded inventory quantities of consumables related to the event type is below the inputted threshold inventory quantity.

10. The system of claim 1, wherein
the cloud server is further configured to:
compare the statistical event data for an individual person with global statistical event data; and
send comparison results and corresponding advices to a mobile device of the user, mobile devices of other users who are granted with permission, or a tracking device with display panel for reviewing and taking preauction actions when the statistical event data of individual person deviate significantly from the norm of the global statistical event data.

11. A method for autonomously tracking events related to caring vulnerable persons, comprising:
receiving event data with a receiving unit;
transmitting event data from the receiving unit via a communication module to a cloud server;
determining, with the cloud server, an event type and an occurrence time of a current event from the acquired event data;
retrieving, with the cloud server, statistical data related to occurrence time and frequency associated with the determined event type and/or at least one related event type from the event data-base;
predicting, with the cloud server, an event type and an occurrence time of a next event based on the determined event type and occurrence time of the current event as well as the retrieved statistical data related to occurrence time and frequency associated with the determined event type and/or at least one related event type;
updating, with the cloud server, the event data-base with the predicted event type and occurrence time of the next event as well as the event data acquired from the receiving unit;
transmitting the predicted event type and occurrence time of the next event to the presenting unit via communication module; and
presenting the predicted event type at the predicted occurrence time of the next event to the user by the presenting unit;
determining with the cloud server, a duration of the current event from the acquired event data; and
adjusting, with the cloud server, the predicted occurrence time and predicted event type of the next event based on the determined duration of the current event; and
wherein the duration of the current event is a time difference between an event-start time when one of buttons of the receiving unit is triggered for inputting the event type and an event-end time when the button triggered at the event-start time is triggered again.

12. The method of claim 11, further comprising:
training a deep learning model with the event data-base; and
using the trained deep learning model to predict the event type and occurrence time of the next event.

13. The method of claim 11, further comprising:
receiving one or more sound recordings;
determining the event type and the occurrence time of the current event from the one or more received sound recordings;
determining one or more event attributes of the current event from the one or more received sound recordings; and
adjusting the predicted occurrence time and predicted event type of the next event based on the determined event attributes of the current event.

14. The method of claim 11, further comprising:
capturing one or more videos;
determining the event type and the occurrence time of the current event from the one or more captured videos;
determining one or more event attributes of the current event from the one or more captured videos; and
adjusting the predicted occurrence time and predicted event type of the next event based on the determined event attributes of the current event.

15. The method of claim 11, further comprising:
calculating inventory quantities of the one or more consumables based on an occurrence frequency associated with the event type stored in the cloud server, and the inputted quantities of inventory of one or more consumables related to an event type inputted by a user; and
placing on-line orders for the one or more consumables related to the event type if recorded inventory quantities of consumables related to the event type is below a threshold inventory quantity inputted by a user.

16. The method of claim 11, further comprising:
comparing the statistical event data for an individual person with global statistical event data; and
sending comparison results and corresponding advices to a mobile device of the user, mobile devices of other users who are granted with permission, or a tracking device with display panel for reviewing and taking preauction actions when the statistical event data of individual person deviate significantly from the norm of the global statistical event data.

* * * * *